UNITED STATES PATENT OFFICE.

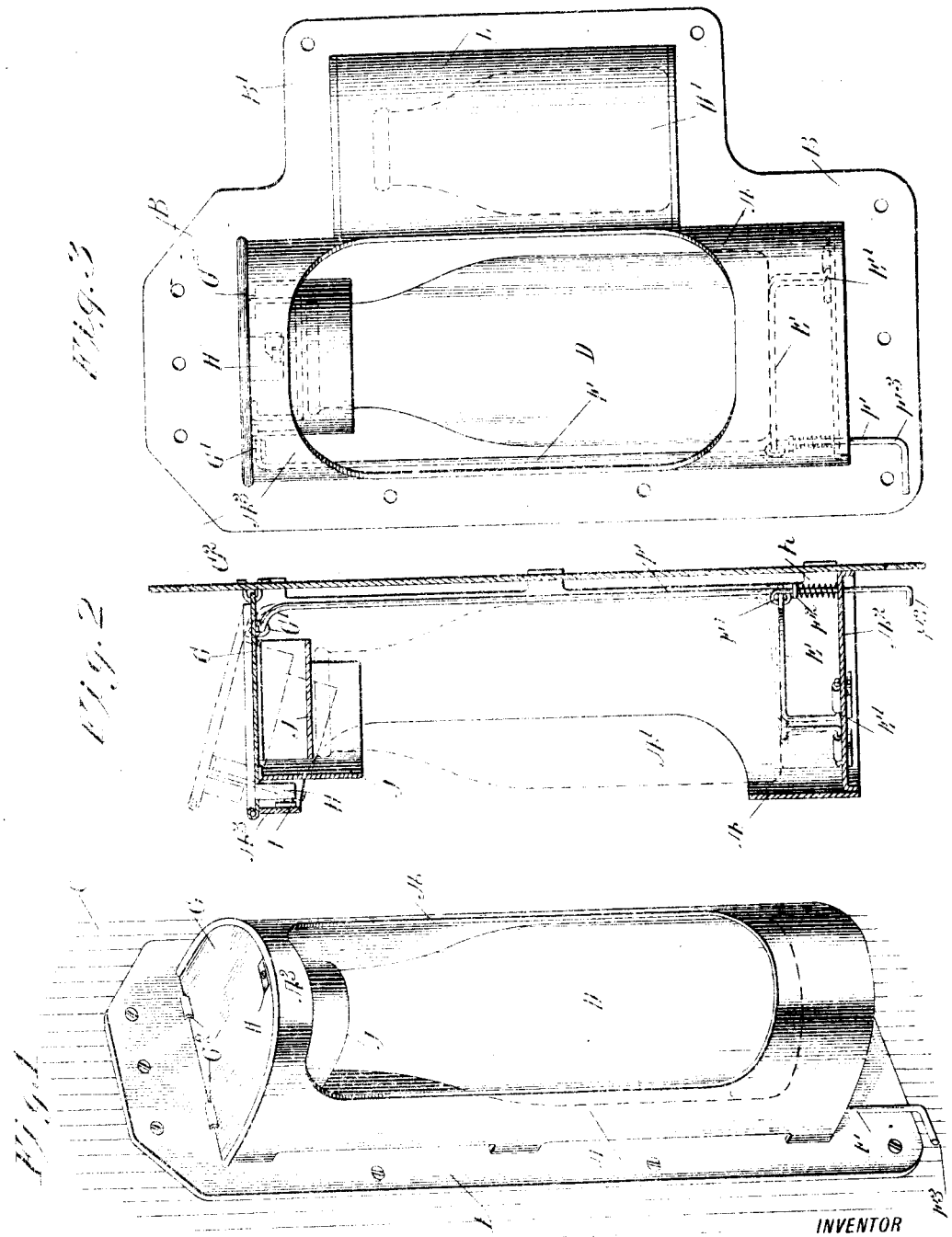

GEORGE FRANKLIN BARR, OF NEW YORK, N. Y.

SAFETY-HOLDER FOR BOTTLES, JARS, AND OTHER RECEPTACLES.

1,026,485.  Specification of Letters Patent.  Patented May 14, 1912.

Application filed June 6, 1911. Serial No. 631,571.

*To all whom it may concern:*

Be it known that I, GEORGE FRANKLIN BARR, a citizen of the United States, and a resident of the city of New York, borough of Manhattan, in the county and State of New York, have invented a new and Improved Safety-Holder for Bottles, Jars, and other Receptacles, of which the following is a full, clear, and exact description.

This invention is an improved safety holder for milk bottles and the like, intended to be attached to a suitable support and to receive and retain a bottle against unauthorized removal.

A practical embodiment of the invention is represented in the accompanying drawings forming a part of this specification, in which similar characters of reference indicate corresponding parts in all the views.

Figure 1 is a perspective view of the safety holder for a milk bottle locked in position in the holder; Fig. 2 is a transverse section of the same, the bottle being shown in dotted lines; and Fig. 3 is a front elevation of a modified form of the holder.

A suitably constructed casing or a frame A is provided with a back B, adapted to be fastened to a suitable support C, such as a wall, fence, post or the like. The front of the casing A is provided with an opening A' for the insertion or removal of a receptacle D, which is adapted to rest on a lever E fulcrumed at E' on the bottom A² of the casing A. The lever E is connected at its free end with a loop F' arranged on a rod F extending upwardly and connected at its upper end with an eye G' on the under side of a cover G for the casing A, the cover G being connected by hinges G² with the back B, as plainly indicated in the drawings. On the forward end of the cover G is arranged a snap lock H, the bolt of which is adapted to engage a keeper I, fastened on the inside of the upper portion A³ of the casing A. The under side of the cover G is provided with a retainer J adapted to engage the upper end of the receptacle D, to hold the receptacle against removal from the casing A when the cover G is in a closed and locked position, as indicated in the drawings. The retainer J is preferably in the form of a semi-circular flange for inclosing the upper front and side portions of the receptacle D; in which flange is arranged a horizontal partition J' adapted to engage the top of the receptacle D.

The rod F is pressed on by a spring K resting at its lower end on the bottom A², and abutting with its upper end on a collar F² attached to the rod F, so that when the cover G is unlocked and the bottle D is removed from the casing then the spring K swings the cover G into an open position, as indicated in dotted lines in Fig. 2. When the cover G is in this position, the receptacle D can be readily placed into the casing A or removed therefrom. The rod F is extended through the bottom A² of the casing A, and the lower outer end of the rod is provided with a handle F³ adapted to be taken hold of by the person placing the receptacle D into the casing A. It is understood that after the receptacle D is placed in the casing A, the weight of the receptacle tends to swing the lever E downward; the downward movement of the lever, however, can be aided by the person placing the bottle in the receptacle, and pressing the handle F³ downward. Now when the lever E swings downward and the rod F slides downward, then a downward swinging movement is given to the cover G, whereby the latter is moved into a closed position and the snap bolt of the lock H readily engages the keeper I, so as to lock the cover G in closed position. When the cover G swings into a closed position then the retainer J engages the upper end of the receptacle D, and consequently the receptacle D cannot be removed from the casing A by unauthorized persons. The authorized person by the use of a key can readily open the lock H and swing the cover G open for removal of the receptacle D from the casing A.

The back B may be extended as indicated in Fig. 3, to form a support B' for another receptacle L adapted to contain a smaller bottle, jar or a like receptacle D'. In practice, the receptacle D is a quart bottle, while the receptacle D' is a pint bottle.

The safety holder shown and described is very simple and durable in construction and can be cheaply manufactured.

Having thus described my invention, I claim as new and desire to secure by Letters Patent:

1. A safety holder for bottles, jars and like receptacles, comprising a casing having an opening at the front for the insertion or removal of a receptacle, a hinged cover for the casing and having a retaining means for the upper portion of the receptacle, a lock for locking the cover when in closed position on the said casing, a support mounted to swing in the lower portion of the casing and adapted to support the receptacle, and a spring-pressed rod engaged by the said support and connected with the said cover.

2. A safety holder for bottles, jars and like receptacles, comprising a casing having an opening at the front for the insertion or removal of a receptacle, a hinged cover for the casing and having a retaining means for engagement with the upper end of the receptacle, a lock for locking the cover when in closed position to the said casing, a support mounted to swing in the lower portion of the casing and adapted to support the receptacle, and a spring-pressed rod intermediately engaged by the said support and connected at its upper end with the said cover, the said rod having its lower free end extending exteriorly of the casing and provided with a handle for manual control of the same.

3. A safety holder for bottles, jars, and like receptacles, comprising a casing provided with a side opening for the insertion and removal of a receptacle, and having a closed base, a hinged cover for the top of the casing having a depending flange, a lower support hinged upon the casing base, a rod intermediately engaged with said support, said rod having its upper end connected to the cover and having its lower free end extended exteriorly of the casing, and a lock for securing the cover in closed position.

4. A safety holder for bottles, jars, and like receptacles, comprising a casing provided with a side opening for the insertion and removal of a receptacle, and having a closed base, a hinged cover for the top of the casing having a depending flange, a lower support comprising a substantially circular wire having its ends bent downwardly and hingedly connected to the casing base, a rod having an intermediate loop through which said circular support wire passes, said rod having its upper end connected to the cover and having its lower free end extended exteriorly of the casing, and a lock for securing the cover in closed position.

In testimony whereof I have signed my name to this specification in the presence of two subscribing witnesses.

GEORGE FRANKLIN BARR.

Witnesses:
THOMAS BALMFORD,
CHARLES DEIDESHEIMER.